United States Patent [19]
Lammers

[11] Patent Number: 5,033,722
[45] Date of Patent: Jul. 23, 1991

[54] RESILIENT MOUNT ASSEMBLY

[75] Inventor: Bryan G. Lammers, Washington, Ill.

[73] Assignee: Caterpillar Inc., Peoria, Ill.

[21] Appl. No.: 396,169

[22] Filed: Aug. 21, 1989

[51] Int. Cl.$^5$ .............................................. F16F 1/36
[52] U.S. Cl. .................. 267/153; 267/140.2; 267/141.1; 267/294; 267/282; 384/221; 403/133; 403/228
[58] Field of Search ............... 267/153, 140.2, 140.5, 267/141, 141.1, 141.2, 152, 292, 293, 294, 277, 276, 281, 282; 403/133, 132, 225, 228, 162, 227, 145; 384/221, 222, 192, 202, 203, 206; 248/606, 630, 603, 609; 416/134 A, 134 R

[56] References Cited
U.S. PATENT DOCUMENTS

| 2,069,270 | 2/1937 | Piron .............................. 403/228 X |
| 3,382,017 | 5/1968 | Cripe .............................. 267/292 X |
| 3,493,814 | 2/1970 | Boggs .............................. 156/294 |
| 3,504,905 | 4/1970 | Irwin .............................. 267/1 |
| 3,666,301 | 5/1972 | Jorn .............................. 267/282 X |
| 3,690,639 | 9/1973 | Brandon et al. .............................. 267/282 |
| 3,989,126 | 11/1976 | Katzer .............................. 188/206 R |
| 4,111,499 | 9/1978 | McCloskey .............................. 308/72 |
| 4,690,231 | 9/1987 | Riml .............................. 180/6.48 |
| 4,772,151 | 9/1988 | Lammers et al. .............................. 403/162 |

FOREIGN PATENT DOCUMENTS

| 1119062 | 12/1961 | Fed. Rep. of Germany ...... 403/228 |
| 1263536 | 5/1961 | France . |
| 2562967 | 10/1985 | France . |
| 907217 | 7/1959 | United Kingdom . |
| 867360 | 5/1961 | United Kingdom . |
| 1490253 | 10/1977 | United Kingdom . |

OTHER PUBLICATIONS

Article entitled "Dynamic Fatigue Life of Rubber", by S. M. Cadwell, taken from the "Industrial and Engineering Chemistry" Book, dated Jan. 15, 1940, Analytic Edition, vol. 12, pp. 19–23.

Primary Examiner—Douglas C. Butler
Attorney, Agent, or Firm—J. W. Burrows

[57] ABSTRACT

Resilient mount assemblies provide absorption of induced loads while permitting some degree of relative rotation between the elements. It is desirable to have resilient mount assemblies which can withstand heavy operating loads while having high angular rotation. In this arrangement, a resilient mount assembly is provided having a segmented assembly interconnecting a first member having a spherical outer surface with a second member having a transverse bore therein. The segmented assembly includes first and second semi-circular half shells with first, second, third, and fourth semi-circular elastomeric layers disposed on respective first and second sides thereof. The first and second semi-circular half shells and their respective first, second, third, and fourth semi-circular elastomeric layers are disposed in intimate contact with the spherical outer surface of the first member. A preloading mechanism is provided and operative to induce a radial force into the first, second, third, and fourth semi-circular elastomeric layers during the assembly thereof. Once the preloading mechanism has been pressed to its full assembled position, the resilient mount assembly has the ability to withstand high operating loads while still having the ability to have high angular rotation between the elements thereof.

12 Claims, 2 Drawing Sheets

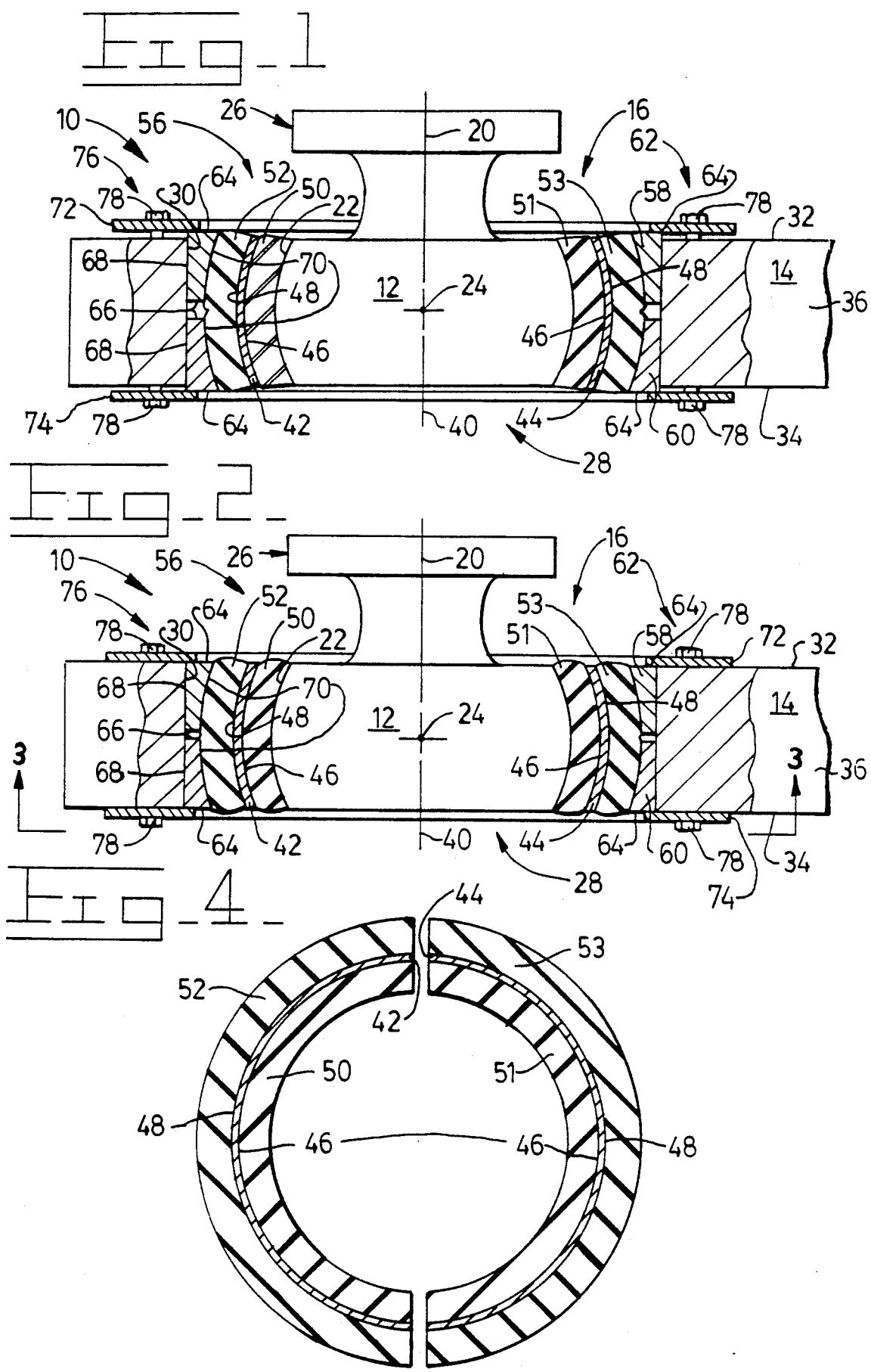

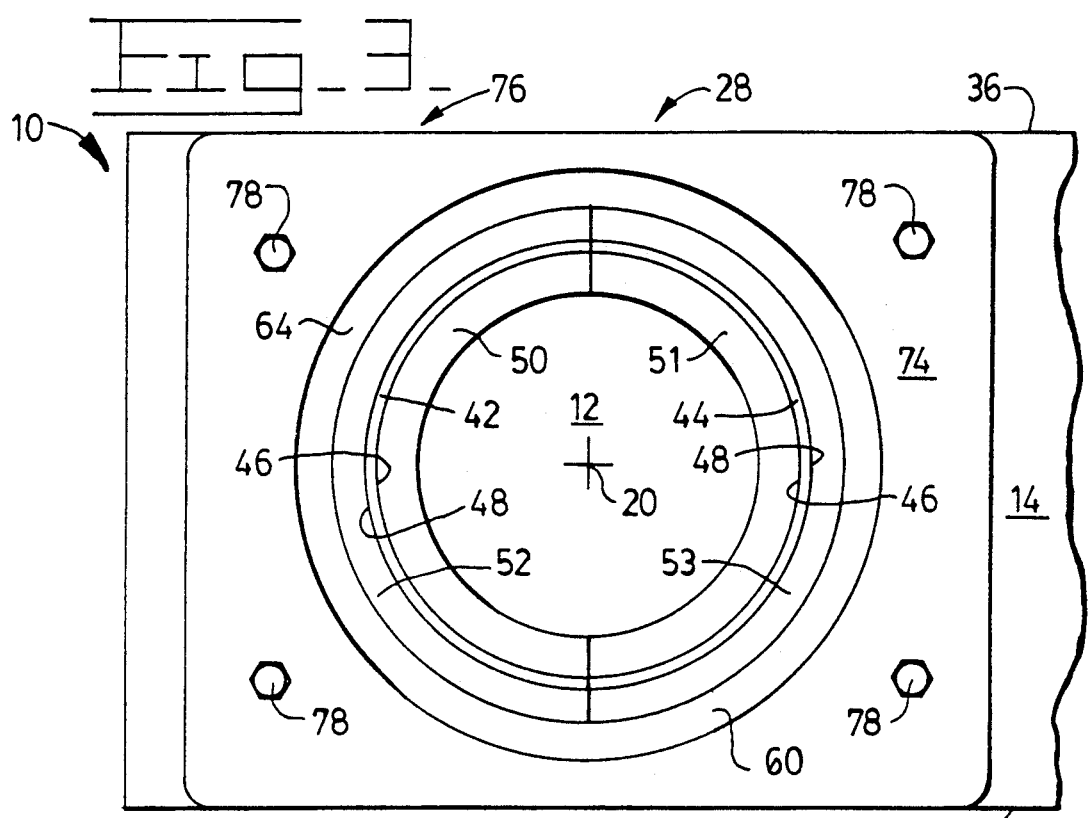
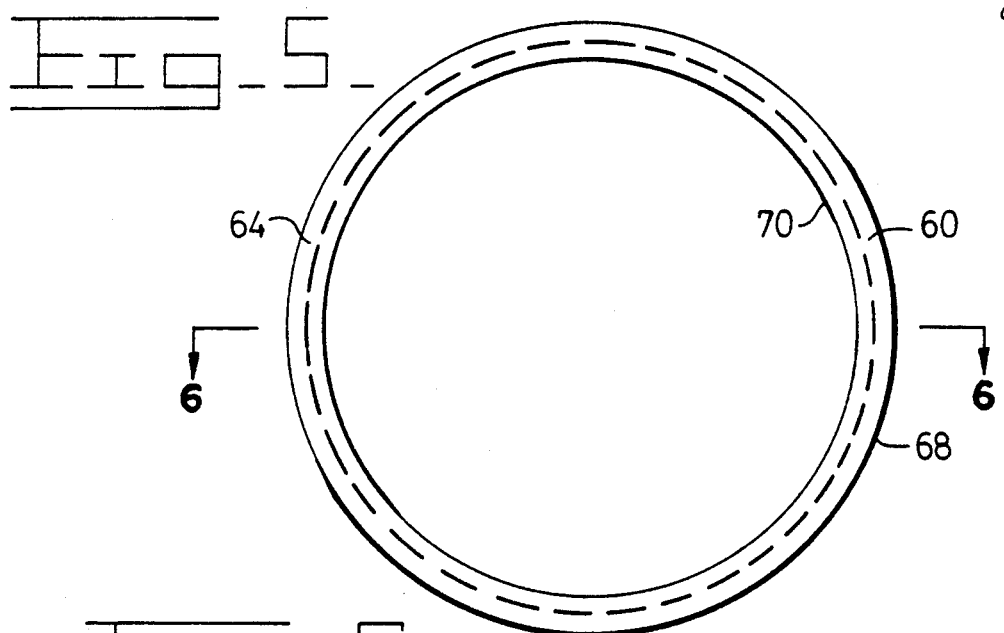
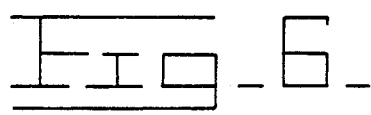

RESILIENT MOUNT ASSEMBLY

TECHNICAL FIELD

This invention relates generally to a mount assembly and more particularly to a resilient mount assembly that allows relative rotation between two members without having rubbing contact between the two members.

BACKGROUND ART

Earthmoving and construction vehicles utilize many mount assemblies that require relative angular rotation between the elements thereof and high operating loads. In the past, these assemblies have been primarily mechanical joints that have to be lubricated or used without lubrication. Naturally, rotatable joints without lubrication will wear more quickly, especially when subject to heavy workloads. In the past, there have been various efforts to provide a resilient joint assembly having relative rotation between the elements thereof while the assembly is being subjected to heavy workloads. In these attempts, it has been necessary to preload the elastomeric material in order to achieve the needed life of the assembly. Furthermore, in order to withstand heavy loads, the thickness of the elastomeric material has been kept as thin as possible. However, when keeping the elastomeric material thin, the ability to rotate the members relative to each other is seriously handicapped, since large amounts of angular rotation results in rupturing of the elastomeric material. Consequently, in order to get high relative rotation between the elements, the thickness of the elastomeric material must be increased. As previously noted, to withstand heavy loads, the elastomeric material should be thin. Therefore, in order to obtain high angular rotation between the elements while working under heavy loads, it has been necessary to provide numerous layers of thin elastomeric material, each being separated by a metallic member. In these arrangements, it becomes extremely difficult to preload the assembly and obtain an even, uniform preloading of the elastomeric material.

The characteristics of mechanisms using preloaded rubber is set forth in an article entitled "Dynamic Fatigue Life of Rubber" by S. M. Cadwell. This article was taken from the Analytic Edition, Volume 12, pages 19-23, of the "Industrial and Engineering Chemistry" book, dated Jan. 15, 1940. This article teaches the basic principle that the ability of a rubber material to withstand rupture due to shear forces is increased substantially if the rubber material is placed under a compressive load. From a review of the subject article, it should be recognized that when a rubber material undergoes internal movement, the rubber material is undergoing a shear deformation. This shear deformation can continue for numerous cycles without rupturing of the rubber material. The fatigue life of the rubber material during shear deformation is greatly enhanced by having the rubber material subjected to a compressive load.

U.S. Pat. No. 3,504,905 issued Apr. 7, 1970 to A. S. Irwin and U.S. Pat. No. 3,989,126 issued Nov. 2, 1976 to E. Katzer, each teach resilient mount assemblies that allow large amounts of rotation between the elements without rupturing of the elastomeric material, but are limited in their abilities to withstand high operating loads.

U.S. Pat. No. 3,494,814 issued Feb. 10, 1970 to R. L. Boggs teaches a resilient mount assembly designed to handle heavy operating loads while also having the ability to have high angular rotation between the elements without rupturing of the elastomeric material. In order to provide the high angular rotation between the elements, the assembly has numerous individual pieces bonded together by a very thin elastomeric material and then preloaded by forcing the assembly into a circular ring. Even though this arrangement provides a resilient mount assembly that can withstand high loads and provide high angular rotation between the elements, it is an extremely complicated mechanism to build and assemble and in many applications would be extremely difficult to uniformly preload the elastomeric material.

U.S. Pat. No. 4,111,499 issued Sept. 5, 1978 to A. R. McCloskey teaches a bearing assembly. As shown in FIGS. 4 and 5 thereof, the bearing assembly has a liner material and a coat of resin separated by a backing material. The liner and backing material is formed between two members to provide a moveable bearing assembly. In this arrangement, there is no shear deformation in the liner material or the coat of resin.

U.S. Pat. No. 4,690,231 issued Sept. 1, 1987 to P. Riml and U.S. Pat. No. 4,772,151 issued Sept. 20, 1988 to B. G. Lammers, et al., each teach a resilient mounting assembly. The elastomeric material of the mounting assembly is preloaded to obtain a mount that can withstand heavy operating loads, but the degree of rotation between the elements is limited to a few degrees.

The present invention is directed to overcoming one or more of the problems as set forth above.

DISCLOSURE OF THE INVENTION

In one aspect of the present invention, a resilient mount assembly is provided. The resilient mount assembly includes a first member having a longitudinal axis with an outer surface disposed about the longitudinal axis. The outer surface of the first member is generally spherical in shape and has a center of radius at a point on the longitudinal axis. A second member is provided having an end portion which defines a transverse bore therein. The first and second members are pivotally interconnected and when assembled, the centerline of the transverse bore generally intersects the center of radius point. This center of radius point is located on the longitudinal axis of the first member. The resilient mount assembly also includes a segmented assembly operative when assembled to interconnect the first and second members. The segmented assembly includes first and second semi-circular half shells. Each of the semi-circular half shells has respective first, and second semi-circular elastomeric layers disposed on an inner side thereof and third and fourth semi-circular elastomeric layers disposed on the outer side thereof. When assembled, each of the first and second elastomeric layers is in intimate contact with the spherical outer surface of the first member. The segmented assembly further includes preloading means for substantially, uniformly loading each of the first, second, third, and fourth elastomeric layers to a predetermined level.

The present invention provides a resilient mount assembly which permits relative multi-axis angular rotation between first and second members while allowing the mount assembly to be subjected to high operating loads. This is accomplished by having the structure capable of uniformly preloading the elastomeric members to a predetermined level.

BRIEF DESCRIPTION OF THE DRAWINGS

Brief Description of the

FIG. 1 is a diagrammatic representation of a resilient mount assembly incorporating an embodiment of the present invention with the elastomeric members in the unloaded condition;

FIG. 2 is a diagrammatic representation incorporating the embodiment of the present invention with the elastomeric members in the loaded condition;

FIG. 3 is a diagrammatic representation illustrating a side view of the embodiment shown in FIG. 2;

FIG. 4 is a diagrammatic representation of some of the elements generally shown in FIG. 1 and illustrated in the unassembled condition;

FIG. 5 is a diagrammatic representation of other elements of the embodiment generally shown in FIG. 1; and FIG. 6 is a cross-sectional view of the elements illustrated in FIG. 5.

BEST MODE FOR CARRYING OUT THE INVENTION

Referring now to the drawings, and more particularly to FIGS. 1, 2, and 3, a resilient mount assembly 10 is provided. The resilient mount assembly 10 includes a first member 12, a second member 14, and a segmented assembly 16. The first member 12 has a longitudinal axis 20 and an outer surface 22 radially disposed thereabout. The outer surface 22 is generally spherical in shape with a center of radius at a point 24 on the longitudinal axis 20. The first member 12 also includes a mounting portion 26 generally defined along the longitudinal axis 20 spaced from the center of radius point 24. The mounting portion 26 is operative to connect the first member to a frame (not shown) or any other portion of a work vehicle (not shown) as needed. The first member 12 is, for example, a trunnion mount.

The second member 14 includes an end portion 28 with a transverse bore 30 defined therein. The end portion 28 has first and second opposite sides 32,34 and top and bottom sides 36,38. The transverse bore 30 has a longitudinal centerline 40 generally perpendicular to the first and second sides 32,34. When assembled, the centerline 40 of the transverse bore 30 intersects the center of radius point 24 located on the longitudinal axis 20 of the first member 12. In normal operation, the centerline 40 and the longitudinal axis 20 generally coincide.

The segmented assembly 16 includes first and second semi-circular half shells 42,44, each having an inner side 46 and an outer side 48. The segmented assembly 16 also includes first and second semi-circular elastomeric layers 50,51 each being respectively positioned adjacent the inner side 46 of the respective first and second semi-circular half shells 42,44. The segmented assembly 16 also includes third and fourth semi-circular elastomeric layers 52,53 each being respectively positioned adjacent the outer side 48 of the respective first and second semi-circular half shells 42,44. In the embodiment illustrated, the first, second, third, and fourth semi-circular elastomeric layers 50,51,52,53 are bonded to the respective first and second semi-circular half shells 42,44. However, it should be recognized that the respective semi-circular elastomeric layers 50,51,52,53 need not be bonded to the respective first and second semi-circular half shells 42,44. Furthermore, even though various types of elastomeric materials may be utilized without departing from the essence of the invention, the subject arrangement utilizes a natural base rubber compound. The hardness range of the natural base rubber compound is generally in the range of 50 to 85 durometer (Shore-"A" Scale) but preferably the hardness range is within 70 to 80 durometer.

The segmented assembly 16 includes preloading means 56 for substantially, uniformly loading each of the first and second pairs of elastomeric layers 50,51,52,53 to a predetermined level. The preloading means 56 includes first and second rings 58,60 and compression means 62.

The first and second rings 58,60 each has a first side 64, a second side 66, a radial outer surface 68, and a radial inner surface 70. The radial outer surface 68 of each of the first and second rings 58,60 is of a size sufficient for insertion into the transverse bore 30 of the second member 14. The radial inner surface 70 is of a configuration in which the inner surface 70 is a concave surface which extends progressively further radially outward from the first side 64 thereof to the second side 66. In the subject arrangement, the inner surface 70 of the first and second rings 58,60 is generally spherical in shape. Upon assembly, each of the first and second rings 58,60 are positioned in the transverse bore 30. In the subject arrangement, the first and second rings 58,60 are press fit into the transverse bore 30. The respective second side 66 of each of the first and second rings 58,60 are adjacent one another and the respective first side 64 of the first ring 58 is adjacent the first side 32 of the second member 14. Likewise, the first side 64 of the second ring 60 is adjacent the second side 34 of the second member 14. Furthermore, upon assembly, the radial inner surface 70 of each of the first and second rings 58,60 is in intimate contact with the third and fourth semi-circular elastomeric layers 52,53.

The compression means 62 includes a first compression plate 72, a second compression plate 74, and securing means 76, such as, bolts 78. The first compression plate 72 is releasably secured to the first side 32 of the second member 14 by the securing means 76. The second compression plate 74 is likewise releasably secured to the second side 34 of the second member 14 by the securing means 76.

FIG. 1 illustrates the resilient mount assembly 10 as initially assembled with the first, second, third, and fourth semi-circular elastomeric layers 50,51,52,53 being in their unloaded position. FIG. 2, however, illustrates the resilient mount assembly 10 with the respective semi-circular elastomeric layers 50,51,52,53 in their substantially, uniformly preloaded condition.

Referring now to FIG. 3 in conjunction with FIGS. 1 and 2, the second compression plate 74 is more clearly illustrated. The first and second compression plates 72,74 are identical in construction and as can be seen from a review of FIGS. 1, 2, and 3, the respective first and second compression plates 72,74 are in intimate contact with the first side 64 of each of the first and second rings 58,60. Thus, by tightening the bolts 78 of the securing means 76, the first and second compression plates 72,74 presses the respective first and second rings 58,60 into the transverse bore 30 to preload the first, second, third, and fourth semi-circular elastomeric layers 50,51,52,53 to the predetermined level.

FIG. 4 better illustrates the first, second, third, and fourth semi-circular elastomeric layers 50,51,52,53 and their relationship with the first and second semi-circular half shells 42,44.

FIG. 5 better illustrates the first and second rings 58,60, while FIG. 6 illustrates a cross-section of the rings 58,60. The cross-section illustrated in FIG. 6 better defines the configuration of the radial inner surface 70 thereof.

It is recognized that various types of elastomeric compounds could be used and that the configuration of the outer surface of the first member 12 and the inner surface 70 of each one of the first and second rings 58,60 could be something other than spherical without departing from the essence of the invention. Furthermore, it is recognized that the preloading means 56 could be applied at various orientations. However, it is believed that having a preloading means 56 oriented perpendicular to the centerline 40 of the transverse bore 30 will function the best to establish a uniform loading of the respective semi-circular elastomeric layers 50,51,52,53.

INDUSTRIAL APPLICABILITY

In the operation of the resilient mount assembly as shown in FIGS. 1-3, the second member 14 is universally rotatable relative to the first member 12. Even though the second member 14 can be universally pivoted about the first member 12, the rotation is normally about an axis in which the centerline 40 of the transverse bore 30 generally coincides with the longitudinal axis 20 of the first member 12. In normal operating conditions, the second member 14 can move relative to the first member 12 through an arc within a range of approximately 40 degrees. During this angular rotation, there is no sliding movement between the respective semi-circular elastomeric layers 50,51,52,53 and the respective spherical outer surface 22 or the first and second rings 58,60. All angular rotation is absorbed by the shear deformation of the elastomeric material of the elastomeric layers 50,51,52,53.

Also during operation, the resilient mount assembly 10 must be able to withstand the high operating workloads, which in many applications can be substantially high. Consequently, the first, second, third, and fourth semi-circular elastomeric layers 50,51,52,53 must be uniformly preloaded to an extent that no part of the respective elastomeric layers 50,51,52,53 can change from a compressed condition into a condition of tension. For example, if the subject resilient mount assembly 10 is being utilized in a crawler type tractor as a trunnion mount for mounting a bulldozer push arm to the track type tractor, the resilient mount must be able to withstand loads larger than the weight of the vehicle. In many applications the loads may be in excess of two times the weight of the vehicle. The resilient mount assembly 10 must be able to withstand the high loads while still maintaining the ability to have angular movement within the range of approximately 40 degrees.

In the subject arrangement, the preloading of the first, second, third, and fourth semi-circular elastomeric layers 50,51,52,53 is accomplished during assembly of the resilient mount assembly 10. More specifically, the second member 14 with the first ring 58 partially pressed into the transverse bore 30 and the first compression plate 72 loosely attached thereto is slipped over the spherical outer surface 22 of the first member 12. The first and second semi-circular half shells 42,44 along with their respective semi-circular elastomeric layers 50,51,52,53 are then placed on opposite sides of the spherical outer surface 22 with the first and second semi-circular elastomeric layers 50,51 being in intimate contact with the spherical outer surface 22. At the same time, the third and fourth semi-circular elastomeric layers 52,53 are now in intimate contact with the inner surface 70 of the first ring 58 which is already partially pressed into the transverse bore 30 of the second member 14. Next, the second ring 60 is pressed into the transverse bore 30 from the second side 34 thereof followed by the second compression plate 74 being loosely secured to the second side 34. At this point, the third and fourth semi-circular elastomeric layers 52,53 are in intimate contact with the radial inner surface 70 of second ring 60. The assembly is now at the point, as shown in FIG. 1, in which the first, second, third, and fourth semi-circular elastomeric layers 50,51,52,53 are in the unloaded condition. In order to properly preload the respective semi-circular elastomeric layers 50,51,52,53 to the predetermined level, the bolts 78 of the fastening means 76 are tightened. The tightening of the bolts 78 forces the respective first and second compression plates 72,74 against the first and second rings 58,60. The movement of the first and second rings 58,60 towards one another induces a radial force into the third and fourth semi-circular elastomeric layers 52,53. This radial force is further induced into the first and second semi-circular elastomeric layers 50 through the first and second semi-circular half shells 42,44. This radially induced force is reacted against by the spherical outer surface 22 of the first member 12. As the first and second rings 58,60 are moved towards one another, a greater force is induced into each of the semi-circular elastomeric layers 50,51,52,53. For a given design criteria, the predetermined level of preload is established once the first and second compression plates 72,74 have moved the first and second rings 58,60 to a position at which the first and second compression plates 72,74 are flush against the first and second sides 32,34 of the second member During the above-noted assembly, even though it would not be absolutely necessary, it is beneficial to provide a lubricant on the spherical outer surface 22 and the radial inner surface 70 of the first and second rings 58,60. The lubricant allows the elastomeric material to flow over the respective outer surface 22 and the inner surface 70 during the preloading thereof. The type of lubricant used will evaporate or dissolve within a very short period of time. Consequently, after assembly, there is no relative motion between the respective semi-circular elastomeric layers 50,51,52,53 and either of the spherical outer surface 22 or the radial inner surfaces 70.

In order to obtain the desired fatigue life of the first, second, third, and fourth semi-circular elastomeric layers 50,51,52,53, it is believed that it would be preferable to use a natural base rubber in the hardness range of 50 to 85 durometer. For the optimum performance, it is believed that the hardness should be in the range of 70 to 80 durometer. The radial thickness of the respective first, second, third, and fourth semi-circular elastomeric layers 50,51,52,53 depends on the level of working loads that the assembly will be subjected to and the degree of angular rotation desired. Higher angular rotation may be achieved by adding additional semi-circular elastomeric layers. However, it may become more difficult to uniformly load the respective elastomeric layers. By having the first and second rings 58,60 oriented perpendicular to the first and second semi-circular half shells 42,44, the uniform loading of the first, second, third, and fourth semi-circular elastomeric layers 50,51,52,53 is more easily achieved.

The first and second semi-circular half shells 42,44 are sandwiched between the respective first and second semi-circular elastomeric layers 50,51 and the third and fourth semi-circular elastomeric layers 52,53. This is beneficial to the extent that it provides an additional surface for the respective elastomeric layers 50,51,52,53 to bear against. The additional bearing surface allows the elastomeric layers to transfer larger radially induced forces. Consequently, the assembly can be subjected to heavy loads while also providing the ability for the elastomeric layers to allow the shear deformation with greater angular movement between the first and second members 12,14 thereof.

The resilient mount assembly 10 as set forth above provides a mount assembly that has the ability to withstand heavy operating loads while also having the ability to have high angular rotation due to the higher shear deformation of the first, second, third, and fourth semi-circular elastomeric layers 50,51,52,53. This arrangement provides a relatively simple way of preloading a resilient mount assembly without requiring special tooling and/or special manufacturing processes.

Other aspects, objects and advantages of this invention can be obtained from a study of the drawings, the disclosure, and the appended claims.

I claim:

1. A resilient mount assembly, comprising:
   a first member having a longitudinal axis with an outer surface disposed about the longitudinal axis, the outer surface being generally spherical in shape with a center of radius at a point on the longitudinal axis;
   a second member having an end portion defining a transverse bore therein, the first and second members being pivotally interconnected and when assembled a center line of the transverse bore generally intersects the center of radius point located on the longitudinal axis of the first member;
   a segmented assembly operative when assembled to interconnect the first and second members, the segmented assembly including first and second semi-circular half shells with each of the semi-circular half shells having first and second semi-circular elastomeric layers disposed on an inner side thereof and third and fourth semi-circular elastomeric layers disposed on an outer side thereof, when assembled each of the first and second semi-circular elastomeric layers is in intimate contact with the spherical outer surface of the first member, and the segmented assembly further includes preloading means for substantially, uniformly loading each of the first, second, third, and fourth semi-circular elastomeric layers to a predetermined level; and the predetermined level of loading of the respective first, second, third and fourth semi-circular elastomeric layers is to a level that during operation of the resilient mount assembly all portions of the respective first, second, third, and fourth semi-circular elastomeric layers remain in compression while the first member and the second member have the ability to rotate relative to each other through a range of approximately 40 degrees, the relative rotation of the first and second members is attributed solely through the shear deformation of the elastomeric material in the respective elastomeric layers.

2. The resilient mount assembly, as set forth in claim 1, wherein the preloading means includes first and second rings each when assembled being in intimate contact with each of the third and fourth elastomeric layers.

3. The resilient mount assembly, as set forth in claim 2, wherein each of the first and second rings have first and second sides, a radial outer surface of a size sufficient for insertion into the transverse bore of the second member, and a radial inner concave surface in which the radial inner surface extends further radially outward from the first side thereof to the second side, the first and second rings are located in the transverse bore of the second member and the first side of the first ring is adjacent one side of the second member while the first side of the second ring is adjacent the other side of the second member.

4. The resilient mount assembly, as set forth in claim 3, wherein the respective first, second, third, and fourth semi-circular elastomeric layers are bonded to the respective first and second semi-circular half shells.

5. The resilient mount assembly, as set forth in claim 4, wherein the preloading means includes compression means for pressing the first and second rings into a position to preload the semi-circular elastomeric layers.

6. The resilient mount assembly, as set forth in claim 5, wherein the compression means includes a second compression plate releasably secured to the other side of the second member adjacent the transverse bore and operative during assembly to contact the first side of the second ring and press it into the transverse bore.

7. The resilient mount assembly, as set froth in claim 6, wherein the compression means includes a second compression plate releasably secured to the other side of the second member adjacent the transverse bore and operative during assembly to contact the first side of the second ring and press it into the transverse bore.

8. The resilient mount assembly, as set forth in claim 7, wherein the first and second compression plates are each releasably secured to the second member by securing means.

9. The resilient mount assembly, as set forth in claim 8, wherein the securing means includes a plurality of bolts.

10. The resilient mount assembly, as set forth in claim 1, wherein each of the first, second, third, and fourth semi-circular elastomeric layers are made from a natural rubber base compound.

11. The resilient mount assembly, as set forth in claim 10, wherein the natural rubber base compound has a hardness within a range of 50 to 85 durometer.

12. The resilient mount assembly, as set forth in claim 11, wherein the hardness of the natural rubber base compound is preferably within a range of 70 to 80 durometer.

* * * * *

UNITED STATES PATENT AND TRADEMARK OFFICE
CERTIFICATE OF CORRECTION

PATENT NO. : 5,033,722
DATED : July 23, 1991
INVENTOR(S) : Bryan G. Lammers

It is certified that error appears in the above-identified patent and that said Letters Patent is hereby corrected as shown below:

Claim 6, column 8, line 33, please delete "other" and insert --one--.

Claim 6, column 8, line 36, please delete "second" and insert --first--.

Signed and Sealed this

Second Day of March, 1993

Attest:

STEPHEN G. KUNIN

*Attesting Officer*   Acting Commissioner of Patents and Trademarks